(12) United States Patent
Yeh et al.

(10) Patent No.: US 9,372,511 B2
(45) Date of Patent: Jun. 21, 2016

(54) ELECTRONIC DEVICE

(71) Applicants: Hsin Yeh, Taipei (TW); Yung-Hsiang Chen, Taipei (TW); Wei-Han Hu, Taipei (TW); Tzu-Chien Lai, Taipei (TW); Cho-Yao Yen, Taipei (TW)

(72) Inventors: Hsin Yeh, Taipei (TW); Yung-Hsiang Chen, Taipei (TW); Wei-Han Hu, Taipei (TW); Tzu-Chien Lai, Taipei (TW); Cho-Yao Yen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 317 days.

(21) Appl. No.: 14/079,650

(22) Filed: Nov. 14, 2013

(65) Prior Publication Data

US 2014/0355190 A1    Dec. 4, 2014

Related U.S. Application Data

(60) Provisional application No. 61/828,697, filed on May 30, 2013.

(51) Int. Cl.
*G06F 1/16* (2006.01)

(52) U.S. Cl.
CPC .................... *G06F 1/1669* (2013.01)

(58) Field of Classification Search
CPC ............................ G06F 1/1654; G06F 1/1669
USPC ........................................ 361/679.17, 679.29
See application file for complete search history.

(56) References Cited

U.S. PATENT DOCUMENTS

| | | | | |
|---|---|---|---|---|
| 6,252,767 B1* | 6/2001 | Carlson | ................. | G06F 1/1616 292/148 |
| 8,363,014 B2* | 1/2013 | Leung | ................... | G06F 1/1632 341/21 |
| 8,947,864 B2* | 2/2015 | Whitt, III | .............. | G06F 1/1618 361/679.09 |
| 9,025,321 B2* | 5/2015 | Liang | ................... | G06F 1/1669 361/679.01 |
| 2005/0052831 A1* | 3/2005 | Chen | ..................... | G06F 1/1616 361/679.11 |
| 2006/0256516 A1* | 11/2006 | Cho | ....................... | G06F 1/1616 361/679.29 |
| 2007/0070591 A1* | 3/2007 | Sheng | ...................... | G06F 1/18 361/679.22 |
| 2007/0091552 A1* | 4/2007 | Liang | .................... | G06F 1/1616 361/679.29 |
| 2007/0121303 A1* | 5/2007 | Wang | .................. | H04M 1/0222 361/752 |

(Continued)

FOREIGN PATENT DOCUMENTS

| | | |
|---|---|---|
| TW | M354116 | 4/2009 |
| TW | 201311087 | 3/2013 |

OTHER PUBLICATIONS

"Office Action of Taiwan Counterpart Application," issued on Mar. 24, 2015, p. 1-p. 8, in which the listed references were cited.

*Primary Examiner* — Adrian S Wilson
(74) *Attorney, Agent, or Firm* — Jianq Chyun IP Office

(57) ABSTRACT

An electronic device including a first body and a second body is provided. The first body has a first connection end. The second body has a second connection end, in which the second connection end has a first magnetic component and a first convex arc surface, and the second body is detachably connected to the first body through a magnetic attractive force between the first magnetic component and the first connection end. The first body and the second body are configured to rotate around a rotation axis relatively to each other, and the first convex arc surface faces the first connection end and extends along a direction parallel to the rotation axis.

17 Claims, 7 Drawing Sheets

(56) References Cited

U.S. PATENT DOCUMENTS

| | | | |
|---|---|---|---|
| 2007/0138806 A1* | 6/2007 | Ligtenberg | E05C 19/16 292/251.5 |
| 2008/0232054 A1* | 9/2008 | Chen | G06F 1/1616 361/679.07 |
| 2009/0086424 A1* | 4/2009 | Jette | G06F 1/1601 361/679.55 |
| 2010/0064536 A1* | 3/2010 | Caskey | G06F 1/1616 33/303 |
| 2010/0085382 A1* | 4/2010 | Lundqvist | G06F 1/1616 345/659 |
| 2010/0123663 A1* | 5/2010 | Leung | G06F 3/0231 345/169 |
| 2010/0238620 A1* | 9/2010 | Fish | G06F 1/1616 361/679.09 |
| 2010/0321877 A1* | 12/2010 | Moser | G06F 1/1616 361/679.29 |
| 2013/0016467 A1* | 1/2013 | Ku | F16M 11/10 361/679.08 |
| 2013/0031289 A1* | 1/2013 | Yeh | G06F 1/1632 710/303 |
| 2013/0170126 A1* | 7/2013 | Lee | G06F 1/1654 361/679.17 |
| 2013/0242490 A1* | 9/2013 | Ku | G06F 1/1628 361/679.3 |
| 2014/0043743 A1* | 2/2014 | Liang | G06F 1/1669 361/679.09 |
| 2014/0118929 A1* | 5/2014 | Leung | G06F 1/1669 361/679.55 |

* cited by examiner

ELECTRONIC DEVICE

CROSS-REFERENCE TO RELATED APPLICATION

This application claims the priority benefits of U.S. provisional application Ser. No. 61/828,697, filed on May 30, 2013. The entirety of the above-mentioned patent application is hereby incorporated by reference herein and made a part of this specification.

BACKGROUND OF THE INVENTION

1. Field of the Invention

The present invention generally relates to an electronic device, and more particularly, to an electronic device with detachable bodies.

2. Description of Related Art

With the advent of the information age, the computer products get more popular year by year. In general, for desktop computers, people put more emphasis on the performance and the desktop computer is not often moved, so that a desktop computer usually appears bulky and heavy and occupies much work space on a desk. In addition, a desktop computer needs to be connected to a display device via a cable, which makes the placing position thereof limited by the cable length. On the other hand, with advances in technology and the integration idea, electronic products are developed towards slim design, and such slenderized developing tendency of the electronic products leads to growing popularity of the computer devices more slenderized than the desktop computers, such as notebook computer, tablet PC and all-in-one PC (AIO PC), in the market of electronic products.

In terms of an AIO PC, the computer is composed of a display device and a host fixed at the display device, and a user can conduct touch inputs to manipulate the AlP PC. Usually, a stand is disposed at the back of the AIO PC, so that when the stand is unfolded, the AlP PC can be supported at the stand to firmly stand on the desktop for the user to manipulate. The unfolded angle of the stand is adjustable to adjust the inclined angle of the AIO PC. In addition, an AIO PC can further be connected to an external keyboard to facilitate the inputs through the keyboard by a user. However, when the user is adjusting the inclined angle of the AIO PC to move it around the desktop, the keyboard on the desktop easily hinders the AIO PC to make the linkage action of the keyboard along with the AIO PC hard to be desired. Therefore, how to allow users to more conveniently and smoothly adjust the inclined angle and position of an AIO PC becomes an important design issue thereof.

SUMMARY OF THE INVENTION

Accordingly, the present invention is directed to an electronic device, in which two bodies are detachably connected to each other to get smooth linkage actions.

An electronic device of the invention includes a first body and a second body. The first body has a first connection end. The second body has a second connection end, in which the second connection end has a first magnetic component and a first convex arc surface, and the second body is detachably connected to the first body through a magnetic attractive force between the first magnetic component and the first connection end. The first body and the second body are configured to rotate relatively to each other around a rotation axis, and the first convex arc surface faces the first connection end and extends along a direction parallel to the rotation axis.

In an embodiment of the present invention, a curvature center of the above-mentioned first convex arc surface is located on the rotation axis.

In an embodiment of the present invention, the above-mentioned first magnetic component includes a plurality of magnets, each of the magnets has a first end surface and a second end surface opposite to each other, the first end surface has a first magnetic polarity, the second end surface has a second magnetic polarity opposite to the first magnetic polarity, the magnets are sequentially arranged along the rotation axis, and any two adjacent magnets are attractive to each other through the magnetic attractive force between the corresponding first end surface and second end surface.

In an embodiment of the present invention, the above-mentioned first connection end has a second magnetic component, the first magnetic component has a first end and a second end opposite to each other, the second magnetic component has a third end and a fourth end opposite to each other, both the first end and the fourth end have the first magnetic polarity, both the second end and the third end have the second magnetic polarity, the first end is aligned with the third end, and the second end is aligned with the fourth end.

In an embodiment of the present invention, the above-mentioned first magnetic component has an inner portion and an outer portion, the inner portion extends along the rotation axis and has a first magnetic polarity, and the outer portion surrounds the inner portion and has a second magnetic polarity.

In an embodiment of the present invention, the above-mentioned first connection end has a second magnetic component, the second magnetic component has a first end surface and a second end surface opposite to each other, the first end surface has the first magnetic polarity, the second end surface has the second magnetic polarity, and the first end surface faces the first magnetic component.

In an embodiment of the present invention, the above-mentioned first magnetic component has a second convex arc surface.

In an embodiment of the present invention, the above-mentioned second connection end has a first concave arc surface, and the second convex arc surface faces the first concave arc surface.

In an embodiment of the present invention, the above-mentioned first connection end has a second concave arc surface, the second concave arc surface and the first convex arc surface are close up to each other through the magnetic attractive force between the first magnetic component and the first connection end, and when the first body and the second body rotate a relatively to each other round the rotation axis, the second concave arc surface and the first convex arc surface slide relatively to each other.

In an embodiment of the present invention, all curvature centers of the second concave arc surface, the second convex arc surface, the first concave arc surface and the first convex arc surface are located on the rotation axis.

In an embodiment of the present invention, the above-mentioned second body has an operation surface and a bottom surface opposite to each other, the second connection end is bent towards the bottom surface to form a bent portion, the first convex arc surface is formed at outside of the bent portion, the first concave arc surface is formed at inside of the bent portion, and the first magnetic component is accommodated at the inside of the bent portion.

In an embodiment of the present invention, the above-mentioned first body has a display surface and an edge adjacent to the display surface, and when the second concave arc surface and the first convex arc surface are separated from each other, the bottom surface of the second body is suitable to lie on the display surface of the first body and the bent portion lays on the edge of the first body along a direction parallel to the display surface.

In an embodiment of the present invention, the above-mentioned first body has a third magnetic component, and when the bottom surface of the second body lies on the display surface of the first body, the magnetic attractive force between the third magnetic component and the second body positions the second body on the first body.

In an embodiment of the present invention, the above-mentioned electronic device further includes a stand, wherein the first connection end lies on a plane, and the stand is pivoted to a back surface of the first body to support the first body on the plane.

In an embodiment of the present invention, when the first connection end moves along the plane to change the inclined angle of the first body, the second body along with the first connection end moves along the plane while the first body and the second body rotate relatively to each other around the rotation axis.

In an embodiment of the present invention, the above-mentioned first body is an all-in-one PC and the second body is a keyboard.

Based on the depiction above, the second connection end of the second body in the invention has the first magnetic component, through which a magnetic attractive force is produced so as to connect the second connection end of the second body to the first connection end of the first body. Since the second connection end has the first convex arc surface facing the first connection end and the extending direction of the first convex arc surface is parallel to the rotation axis for the first body and the second body to rotate relatively to each other, so that during the relative rotation of the first body and the second body, a smaller interval between the second connection end and the first connection end is maintained through the first convex arc surface, which can ensure a sufficient magnetic attractive force occurs between the first magnetic component and the first connection end for connecting the first body and the second body, so as to avoid the second body from dropping off the first body to hinder the moving of the first body and to make the linkage action between the first body and the second body smoothly performed.

In order to make the features and advantages of the present invention more comprehensible, the present invention is further described in detail in the following with reference to the embodiments and the accompanying drawings.

DESCRIPTION OF THE EMBODIMENTS

Figure 1:
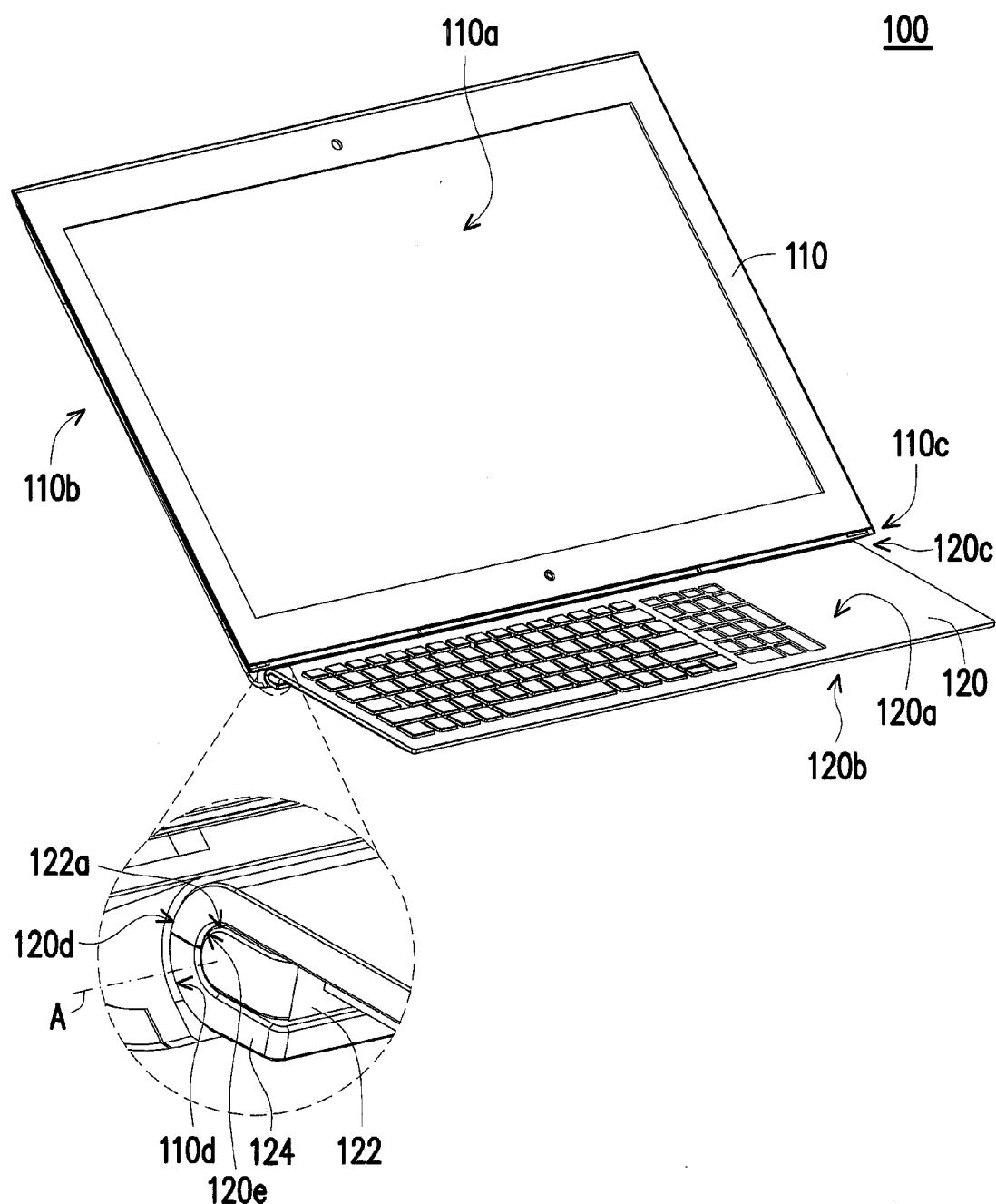
FIG. 1 is a three-dimensional diagram of an electronic device according to an embodiment of the present invention.
Figure 2:
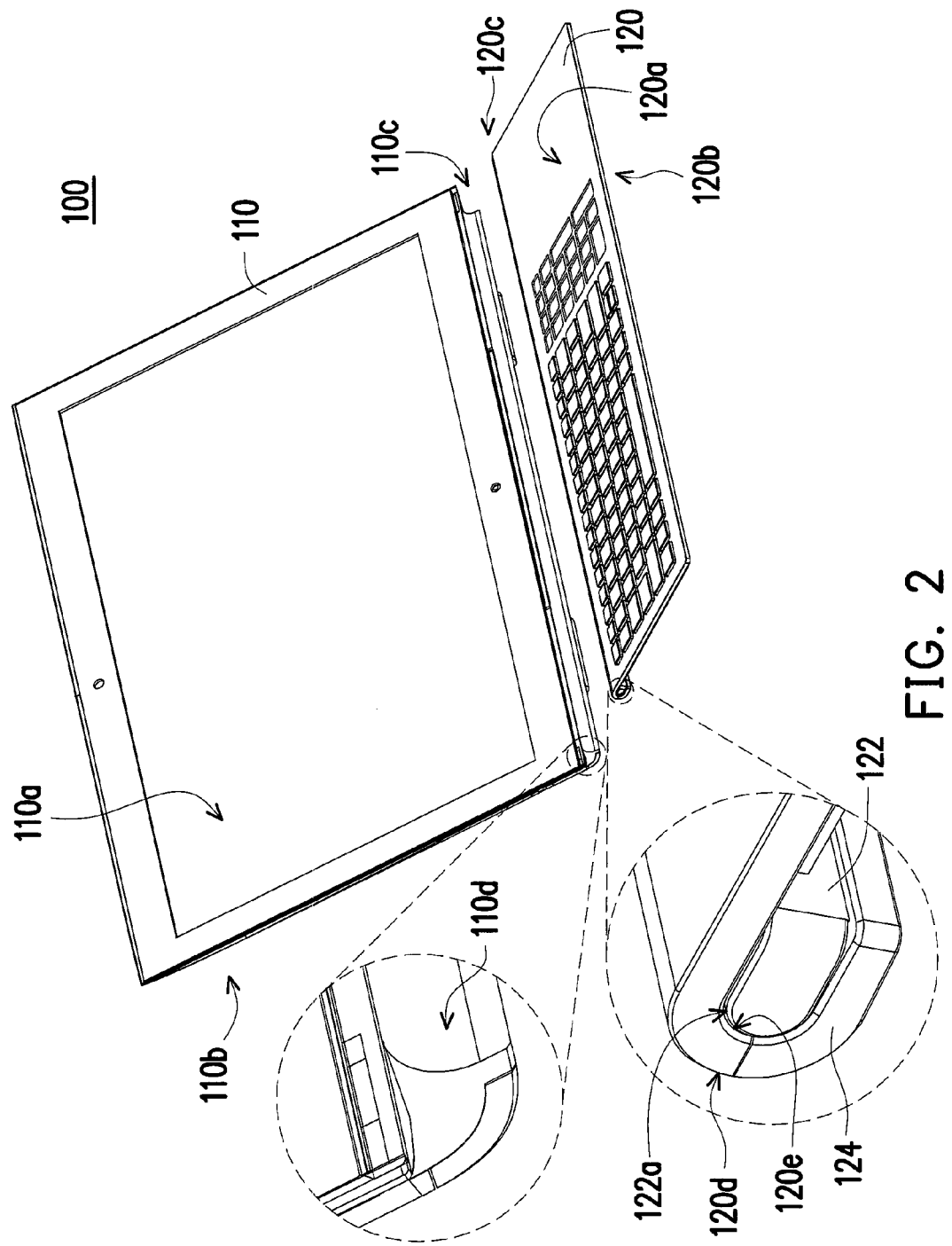
FIG. 2 is a diagram showing the first body and the second body of FIG. 1 unfolded.
Figure 3:
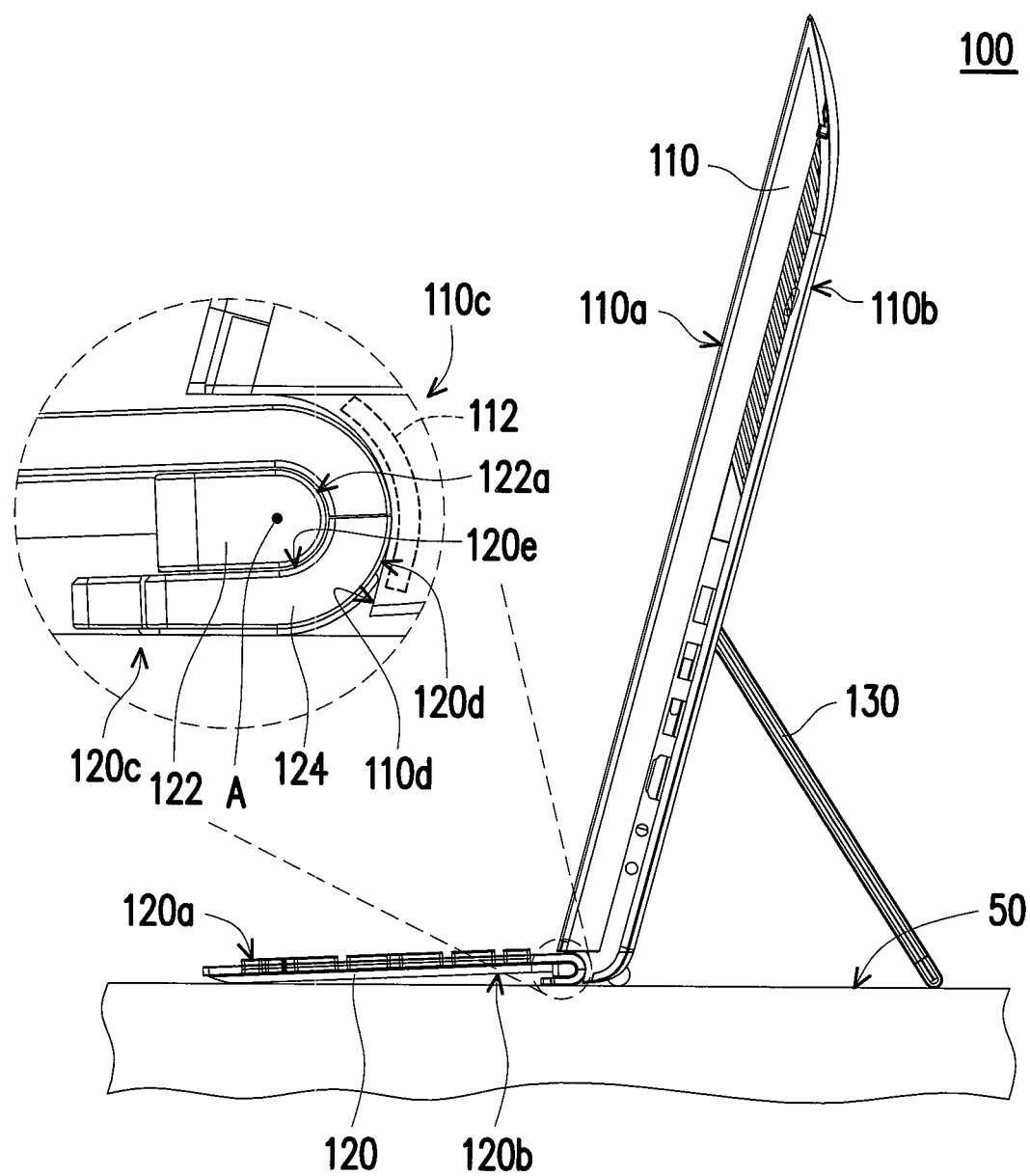
FIG. 3 is a side-view diagram of the electronic device of FIG. 1.

FIG. 1 is a three-dimensional diagram of an electronic device according to an embodiment of the present invention, FIG. 2 is a diagram showing the first body and the second body of FIG. 1 unfolded and FIG. 3 is a side-view diagram of the electronic device of FIG. 1. Referring to FIGS. 1-3, an electronic device 100 of the embodiment includes a first body 110, a second body 120 and a stand 130. The first body 110 is, for example, an MO PC and the second body 120 is, for example, a keyboard externally connected to the AIO PC. The first body 110 has a display surface 110a, a back surface 110b opposite to the display surface 110a and a first connection end 110c. The second body 120 has an operation surface 120a, a bottom surface 120b opposite to the operation surface 120a and a second connection end 120c. The first connection end 110c of the first body 110 is configured to lie on a plane 50, as shown by FIG. 3. The second body 120 is also configured to lie on the plane 50 and is connected to the first connection end 110c of the first body 110 through the second connection end 120c. The plane 50 is, for example, a desktop or any surface suitable to place the electronic device 100 thereon. The stand 130 is pivoted at the back surface 110b of the first body 110 and supports the first body 110 on the plane 50. The user can perform touch input on the display surface 110a of the first body 110 or perform input by using the operation surface 120a of the second body 120.

Figure 4A:
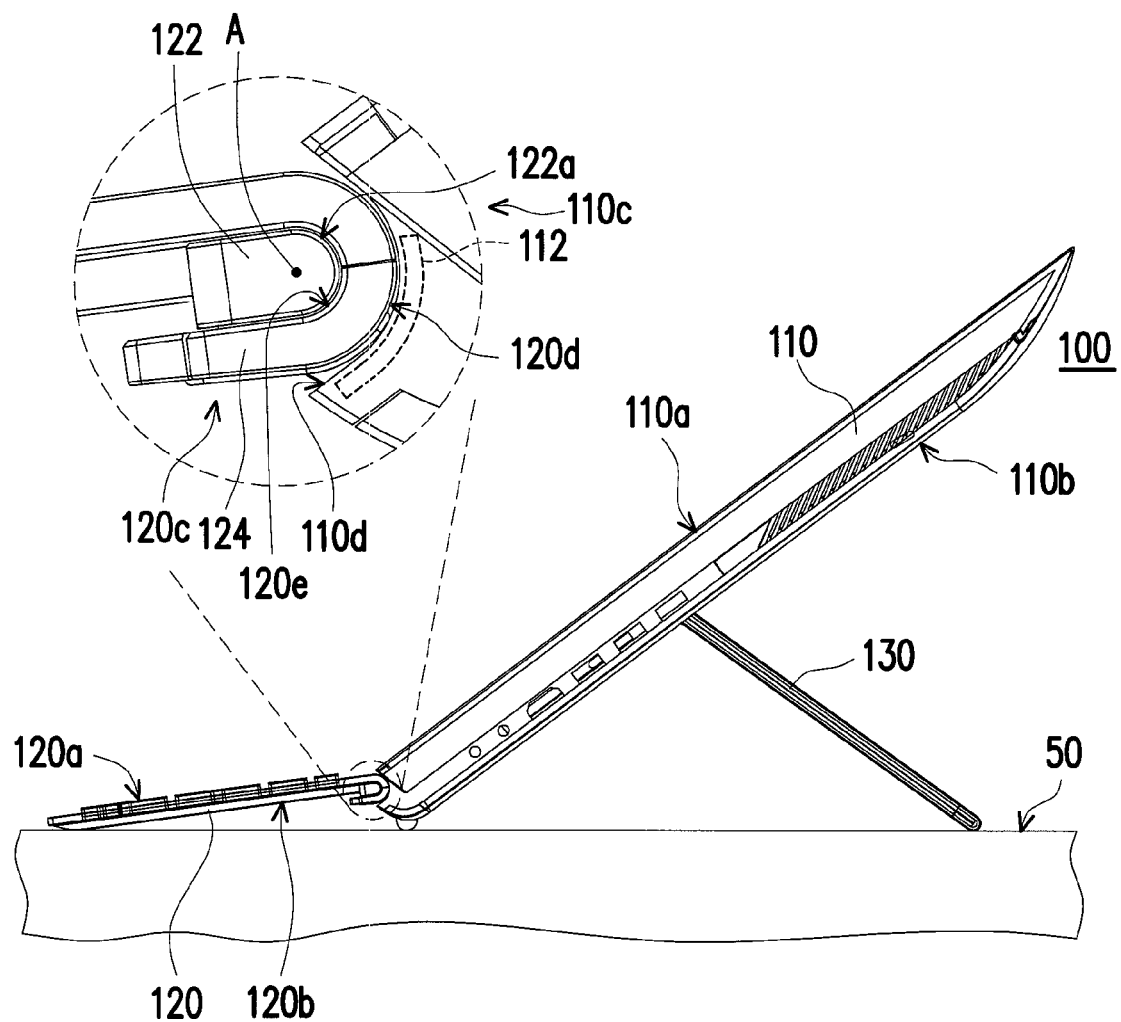
FIGS. 4A and 4B are flowcharts showing actions of the electronic device in FIG. 3.
Figure 4B:
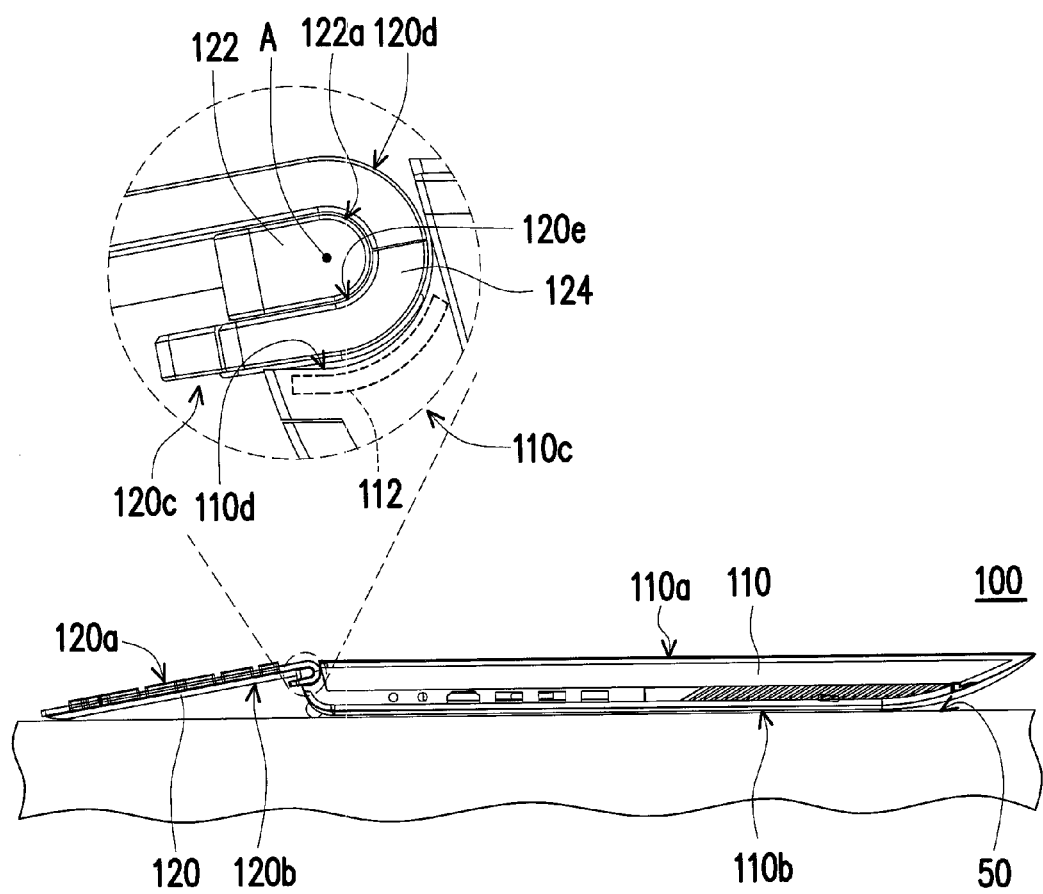

FIGS. 4A and 4B are flowcharts showing actions of the electronic device in FIG. 3. In more details, the second connection end 120c has a first magnetic component 122 and a first convex arc surface 120d, while the first magnetic component 122 has a second convex arc surface 122a, and the first connection end 110c has a second magnetic component 112. The second body 120 can be detachably connected to the first body 110 by means of the magnetic attractive force between the first magnetic component 122 and the second magnetic component 112 of the first connection end 110c. The user can move the first connection end 110c of the first body 110 by applying a force onto the first body 110 to the position shown by FIG. 4A along the plane 50 from the position shown by FIG. 3 so as to change the inclined angle of the first body 110. Further, the user can apply a force onto the first body 110 to change the orientation of the first body 110 from the state of FIG. 4A to the state of FIG. 4B to lie horizontally on the plane 50. During changing the electronic device 100 from the state of FIG. 3 to the state of FIG. 4A and then from the state of FIG. 4A to the state of FIG. 4B, the first body 110 rotates around the rotation axis A relatively to the second body 120.

In the embodiment, both the first convex arc surface 120d of the second connection end 120c and the second convex arc surface 122a of the first magnetic component 122 face the first connection end 110c of the first body 110 and extend along the direction parallel to the rotation axis A, and both the curvature centers of the first convex arc surface 120d and the second convex arc surface 122a are located on the rotation axis A. Thus, during the relative rotations of the first body 110 and the second body 120 as shown by FIGS. 3, 4a and 4B, the second connection end 120c and the first magnetic component 122 can keep a small interval from the first connection end 110c through the first convex arc surface 120d and the second convex arc surface 122a, which can ensure the magnetic attractive force between the first magnetic component 122 and the second magnetic component 112 of the first connection end 110c is sufficient to connect the first body 110 and the second body 120, so as to avoid the second body 120 from dropping off the first body 110 to hinder the moving of the first body 110 and to make the linkage action of the first body 110 and the second body 120 smooth.

Figure 5:
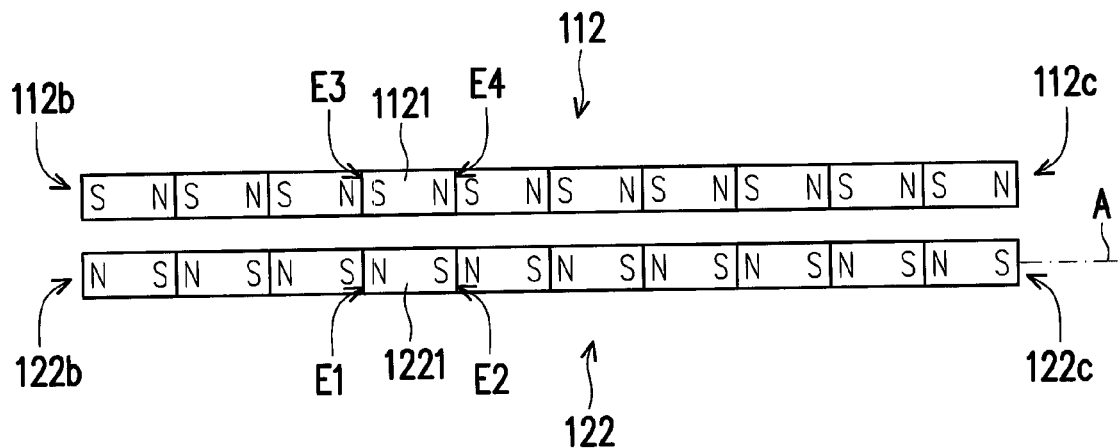
FIG. 5 is a top-view diagram of the first magnetic component and the second magnetic component of FIG. 3.

FIG. 5 is a top-view diagram of the first magnetic component and the second magnetic component of FIG. 3. For better illustrating, only the first magnetic component 122 and the second magnetic component 112 are shown in FIG. 5, but other parts such as the first body 110 and the second body 120 in FIG. 3 are omitted from showing. Referring to FIG. 5, in the embodiment, the first magnetic component 122 includes a plurality of magnets 1221, and each of the magnets 1221 has a first end surface E1 and a second end surface E2 opposite to each other, wherein the first end surface E1 has a first magnetic polarity (N pole is illustrated), the second end surface E2 has a second magnetic polarity (S pole is illustrated) opposite to the first magnetic polarity, the magnets 1221 are sequentially arranged along the rotation axis A, and any adjacent two magnets 1221 are attractive to each other through the magnetic attractive force between the corresponding first end surface E1 and second end surface E2 to make the first end 122b and the second end 122c of the first magnetic component 122 respectively have the above-mentioned first magnetic polarity and second magnetic polarity.

Similarly, the second magnetic component 112 includes a plurality of magnets 1121, and each of the magnets 1121 has a third end surface E3 and a fourth end surface E4 opposite to each other, wherein the third end surface E3 has the above-mentioned second magnetic polarity, the fourth end surface E4 has the above-mentioned first magnetic polarity, the magnets 1121 are sequentially arranged, and any adjacent two magnets 1121 are attractive to each other through the magnetic attractive force between the corresponding third end surface E3 and fourth end surface E4 to make the third end 112b and the fourth end 112c of the second magnetic component 112 respectively have the above-mentioned second magnetic polarity and first magnetic polarity. Since the magnetic polarity (N polarity) of the first end 122b of the first magnetic component 122 is opposite to the magnetic polarity (S polarity) of the third end 112b of the second magnetic component 112, the magnetic polarity (S polarity) of the second end 122c of the first magnetic component 122 is opposite to the magnetic polarity (N polarity) of the fourth end 112c of the second magnetic component 112, and the first end 122b and the second end 122c of the first magnetic component 122 are respectively aligned to the third end 112b and the fourth end 112c of the second magnetic component 112, therefore, during the relative rotation of the first magnetic component 122 to the second magnetic component 112 around rotation axis A, the first magnetic component 122 and the second magnetic component 112 keep attracting each other.

Figure 6:
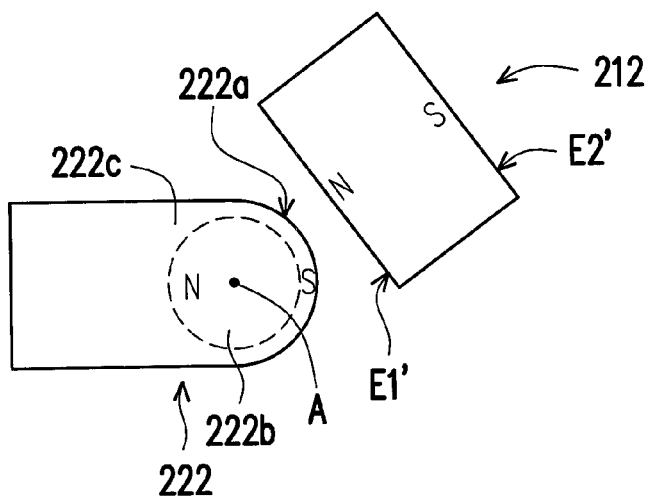
FIG. 6 is a side-view diagram of a first magnetic component and a second magnetic component according to another embodiment of the present invention.

The distribution of the magnetic polarities of the first magnetic component and the second magnetic component is not limited by the invention, referring the following examples in association with the figures. FIG. 6 is a side-view diagram of a first magnetic component and a second magnetic component according to another embodiment of the present invention. Referring to FIG. 6, the functions of a first magnetic component 222 together with the second convex arc surface 222a thereof and a second magnetic component 212 in the embodiment are similar to the functions of the first magnetic component 122, the second convex arc surface 122a of the first magnetic component 122 and the second magnetic component 112 in FIG. 3, which is omitted to describe. The difference of the embodiment in FIG. 6 from the embodiment in FIG. 3 rests in that the first magnetic component 222 has an inner portion 222b and an outer portion 222c, in which the inner portion 222b extends along a rotation axis A' (the same as the rotation axis A in FIG. 3) and has the first magnetic polarity (N polarity herein is shown), and the outer portion 222c surrounds the inner portion 222b and has the second magnetic polarity (S polarity herein is shown). The second magnetic component 212 has a first end surface E1' and a second end surface E2' opposite to each other. The first end surface E1' has the first magnetic polarity, the second end surface E2' has the second magnetic polarity, and the first end surface E1' faces the first magnetic component 222, so that during the relative rotation of the first magnetic component 222 to the second magnetic component 212 around rotation axis A', the first magnetic component 222 and the second magnetic component 212 keep attracting each other.

In other embodiments, the above-mentioned second magnetic component 112 can be replaced by a magnet-inductive metallic part, and the first body 110 and the second body 120 are combined with each other through the magnetic attractive force between the first magnetic component 122 and the magnet-inductive metallic part, which the present invention is not limited to.

Referring to FIGS. 1-3, the second connection end 120c of the second body 120 in the embodiment is bent towards the bottom surface 120b to form a bent portion 124, in which the outside of the bent portion 124 forms the above-mentioned first convex arc surface 120d, the inside of the bent portion 124 accommodates the first magnetic component 122 and has a first concave arc surface 120e, and the second convex arc surface 122a of the first magnetic component 122 faces the first concave arc surface 120e. The first connection end 110c of the first body 110 has a second concave arc surface 110d, and the second concave arc surface 110d and the first convex arc surface 120d are close up to each other through the magnetic attractive force between the first magnetic component 122 and the second magnetic component 112 of the first connection end 110c. During the relative rotation of the first body 110 to the second body 120 around rotation axis A, the second concave arc surface 110d and the first convex arc surface 120d slide relatively to each other. In the embodiment, when the second body 120 is connected to the first connection end 110c of the first body 110 through the second connection end 120c thereof, all the curvature centers of the second concave arc surface 110d, the first convex arc surface 120d, the first concave arc surface 120e and the second convex arc surface 122a are, for example, located on the rotation axis A, so that the first connection end 110c and the second connection end 120c can smoothly rotate relatively to each other around the rotation axis A and the distance of the second convex arc surface 122a to the first connection end 110c remains unchanged to ensure the magnetic attractive force between the first magnetic component 122 and the second magnetic component 112 is sufficient to connect the first body 110 and the second body 120.

Figure 7:
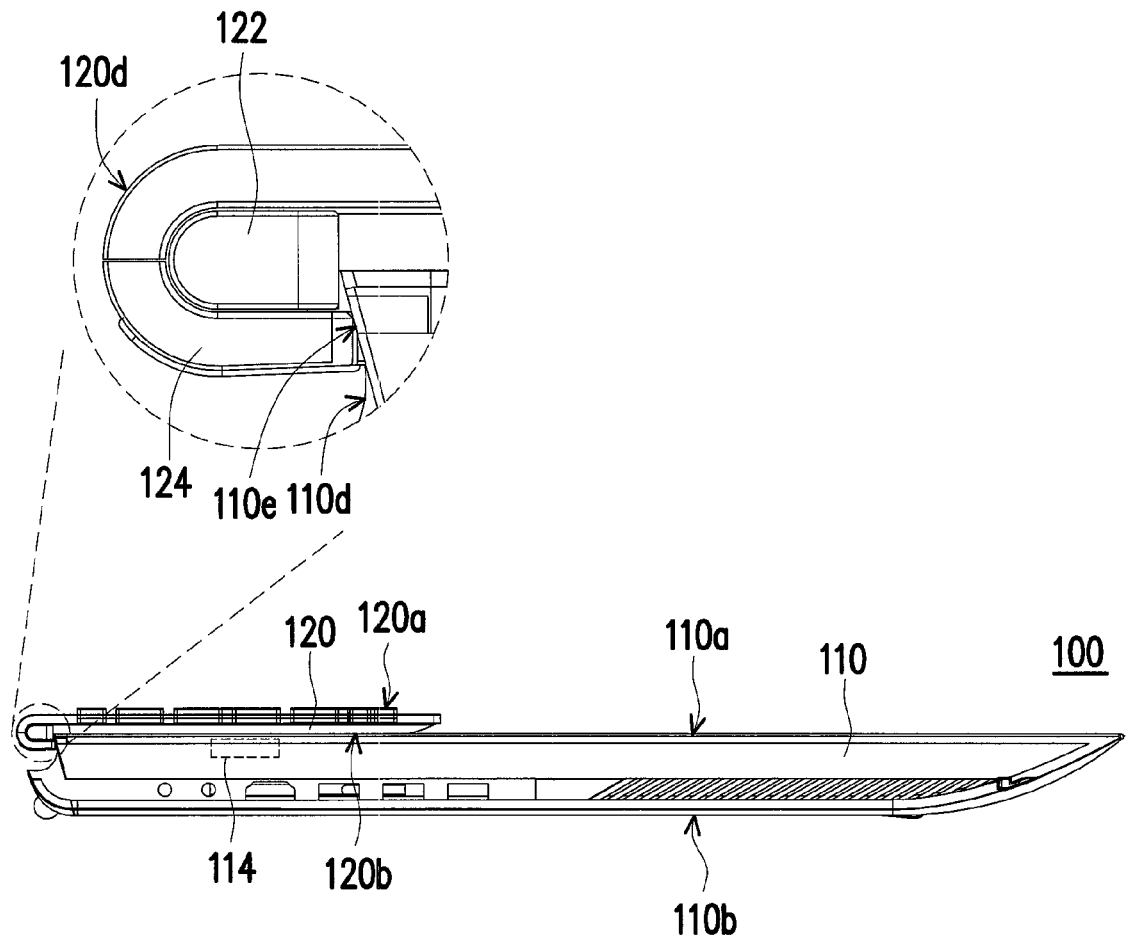
FIG. 7 is a diagram showing the second body of FIG. 4B folded with the first body.

FIG. 7 is a diagram showing the second body of FIG. 4B folded with the first body. Referring to FIG. 7, the second body 120 has an edge 110e adjacent to the display surface 110a, and the first body 110 has a third magnetic component 114 therein. When the second concave arc surface 110d of the first body 110 and the first convex arc surface 120d of the second body 120 are separated from each other, the bottom surface 120b of the second body 120 can be placed on the display surface 110a of the first body 110, the inside of the bent portion 124 of the second body 120 can be laid at the edge 110e of the first body 110 along the direction parallel to the display surface 110a, and the magnetic attractive force between the third magnetic component 114 and the second body 120 can make the second body 120 be positioned on the first body 110, that way the user may pack or carrying the electronic device 100 easily. The second body 120 in the embodiment has, for example, a metallic casing or a magnetic component corresponding to the third magnetic component 114 to produce the above-mentioned magnetic attractive force.

In summary, the second connection end of the second body in the invention has the first magnetic component, through which a magnetic attractive force is produced so as to connect the second connection end of the second body to the first connection end of the first body. Since the first convex arc surface of the second connection end faces the second concave arc surface of the first connection end and extends along the direction parallel to the rotation axis for the first body and the second body to rotate relatively, so that during the relative rotation of the first body and the second body, the distance between the first convex arc surface and the first connection end remains unchanged to ensure a magnetic attractive force between the first magnetic component and the second magnetic component of the first connection end is sufficient, so as to avoid the second body from dropping off the first body to hinder the moving of the first body and to make the linkage action between the first body and the second body smoothly performed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electronic device, comprising:
a first body, having a first connection end; and
a second body, having a second connection end, wherein the second connection end has a first magnetic component and a first convex arc surface, the second body is detachably connected to the first body through a magnetic attractive force between the first magnetic component and the first connection end, the first body and the second body are configured to rotate relatively to each other around a rotation axis, and the first convex arc surface faces the first connection end and extends along a direction parallel to the rotation axis,
wherein the first magnetic component has a second convex arc surface, and the second convex arc surface faces the first connection end.

2. The electronic device as claimed in claim 1, wherein a curvature center of the first convex arc surface is located on the rotation axis.

3. The electronic device as claimed in claim 1, wherein the first magnetic component comprises a plurality of magnets, each of the magnets has a first end surface and a second end surface opposite to each other, the first end surface has a first magnetic polarity, the second end surface has a second magnetic polarity opposite to the first magnetic polarity, the magnets are sequentially arranged along the rotation axis, and any two adjacent magnets are attractive to each other through the magnetic attractive force between the corresponding first end surface and second end surface.

4. The electronic device as claimed in claim 3, wherein the first connection end has a second magnetic component, the first magnetic component has a first end and a second end opposite to each other, the second magnetic component has a third end and a fourth end opposite to each other, both the first end and the fourth end have the first magnetic polarity, both the second end and the third end have the second magnetic polarity, the first end is aligned with the third end, and the second end is aligned with the fourth end.

5. The electronic device as claimed in claim 1, wherein the first magnetic component has an inner portion and an outer portion, the inner portion extends along the rotation axis and has a first magnetic polarity, and the outer portion surrounds the inner portion and has a second magnetic polarity.

6. The electronic device as claimed in claim 5, wherein the first connection end has a second magnetic component, the second magnetic component has a first end surface and a second end surface opposite to each other, the first end surface has the first magnetic polarity, the second end surface has the second magnetic polarity, and the first end surface faces the first magnetic component.

7. The electronic device as claimed in claim 1, wherein the second connection end has a first concave arc surface, and the second convex arc surface faces the first concave arc surface.

8. The electronic device as claimed in claim 7, wherein the first connection end has a second concave arc surface, the second concave arc surface and the first convex arc surface are close up to each other through the magnetic attractive force between the first magnetic component and the first connection end, and when the first body and the second body rotate relatively to each other around the rotation axis, the second concave arc surface and the first convex arc surface slide relatively to each other.

9. The electronic device as claimed in claim 8, wherein all curvature centers of the second concave arc surface, the second convex arc surface, the first concave arc surface and the first convex arc surface are located on the rotation axis.

10. The electronic device as claimed in claim 7, wherein the second body has an operation surface and a bottom surface opposite to each other, the second connection end is bent towards the bottom surface to form a bent portion, the first convex arc surface is formed at outside of the bent portion, the first concave arc surface is formed at inside of the bent portion, and the first magnetic component is accommodated at the inside of the bent portion.

11. The electronic device as claimed in claim 10, wherein the first body has a display surface and an edge adjacent to the display surface, and when the second concave arc surface and the first convex arc surface are separated from each other, the bottom surface of the second body is suitable to lie on the display surface of the first body and the bent portion lays on the edge of the first body along a direction parallel to the display surface.

12. The electronic device as claimed in claim 11, wherein the first body has a third magnetic component, and when the bottom surface of the second body lies on the display surface of the first body, the magnetic attractive force between the third magnetic component and the second body positions the second body on the first body.

13. The electronic device as claimed in claim 1, further comprising a stand, wherein the first connection end lies on a plane, and the stand is pivoted to a back surface of the first body to support the first body on the plane.

14. The electronic device as claimed in claim 13, wherein when the first connection end moves along the plane to change an inclined angle of the first body, the second body along with the first connection end moves along the plane while the first body and the second body rotate relatively to each other around the rotation axis.

15. The electronic device as claimed in claim 1, wherein the first body is an all-in-one PC and the second body is a keyboard.

16. The electronic device as claimed in claim 1, wherein the first connection end has a second concave arc surface, the second concave arc surface and the first convex arc surface are close up to each other through a magnetic attractive force between the first magnetic component and the first connection end, and when the first body and the second body rotate relatively to each other around the rotation axis, the second concave arc surface and the first convex arc surface slide relatively to each other.

17. The electronic device as claimed in claim 16, wherein both curvature centers of the second concave arc surface and the first convex arc surface are located on the rotation axis.

* * * * *